(12) United States Patent
Belliard (10) Patent No.: US 10,613,860 B2
(45) Date of Patent: Apr. 7, 2020

(54) COMPUTER ARCHITECTURE

(71) Applicant: Arm Limited, Cambridge (GB)

(72) Inventor: Vincent Roger Maurice Belliard, San Jose, CA (US)

(73) Assignee: ARM Limited, Cambridge (GB)

( * ) Notice: Subject to any disclaimer, the term of this patent is extended or adjusted under 35 U.S.C. 154(b) by 194 days.

(21) Appl. No.: 15/347,768

(22) Filed: Nov. 9, 2016

(65) Prior Publication Data

US 2018/0129437 A1     May 10, 2018

(51) Int. Cl.
*G06F 3/06* (2006.01)
*G06F 9/30* (2018.01)
*G06F 12/1009* (2016.01)

(52) U.S. Cl.
CPC ........ *G06F 9/3001* (2013.01); *G06F 12/1009* (2013.01); *G06F 2212/1044* (2013.01); *G06F 2212/657* (2013.01)

(58) Field of Classification Search
CPC .. G06F 3/0659; G06F 2212/657; G06F 9/468; G06F 3/0622; G06F 3/0631; G06F 9/3001; G06F 12/1009; G06F 2212/1044
USPC ......................................................... 711/170
See application file for complete search history.

(56) References Cited

U.S. PATENT DOCUMENTS

| | | | | |
|---|---|---|---|---|
| 9,268,806 | B1 * | 2/2016 | Kesselman | G06F 16/2255 |
| 2008/0016316 | A1 * | 1/2008 | Codrescu | G06F 12/1009 |
| | | | | 711/207 |
| 2008/0147990 | A1 * | 6/2008 | Pesavento | G06F 12/0875 |
| | | | | 711/145 |
| 2010/0332850 | A1 * | 12/2010 | Boivie | G06F 21/125 |
| | | | | 713/189 |
| 2014/0372731 | A1 * | 12/2014 | Nystad | G06F 9/3802 |
| | | | | 712/207 |
| 2016/0232103 | A1 * | 8/2016 | Schmisseur | G06F 13/16 |

OTHER PUBLICATIONS

"Burroughs large systems" Wikipedia https://en.wikipedia.org/wiki/Burroughs_large_systems#Tagged_architecture, retrieved Mar. 20, 2018, 14 pages.

* cited by examiner

*Primary Examiner* — Hashem Farrokh
(74) *Attorney, Agent, or Firm* — Nixon & Vanderhye, P.C.

(57) ABSTRACT

A tagged memory organized is into memory chunks. Each memory chunk has a data field, a type field and an owner address field. The type field indicates type of data stored in the data field. The owner address field indicates which objects own which memory chunks. A memory manager has exclusive ability to allocate the memory chunks, deallocate the memory chunks, write to the memory chunks and read the memory chunks.

24 Claims, 10 Drawing Sheets

FIG. 1

Example of memory state

| | Address | Data 128 bits | Type 64 bits | Owner address 32 bits |
|---|---|---|---|---|
| Object #1 | 0x00000000 | 0x00000004ffff1234123456789abcdef0 | 0xe002b8c180000002 | 0x00000000 |
| Free chunk | 0x00000001 | xxxxxxxxxxxxxxxxxxxxxxxxxxxxxxxx | 0x0000000000000000 | 0xffffffff |
| Object #2 | 0x00000002 | 0x00000000000000010000000000000001 | 0xc000000100000002 | 0x00000002 |
| | 0x00000003 | 0x00000000000000010000000000000001 | 0xc000000100000002 | 0x00000002 |
| Object #3 | 0x00000004 | 0x00000000000000010000000000000001 | 0xc000000100000002 | 0x00000004 |
| | 0x00000005 | 0x00000000000000010000000000000001 | 0xc000000100000002 | 0x00000004 |
| | 0x00000006 | 0x00000000000000010000000000000001 | 0xc000000100000002 | 0x00000004 |
| | 0x00000007 | 0x00000000000000010000000000000001 | 0xc000000100000002 | 0x00000004 |
| Free chunk | 0x00000008 | xxxxxxxxxxxxxxxxxxxxxxxxxxxxxxxx | 0x0000000000000000 | 0xffffffff |
| Free chunk | 0x00000007 | xxxxxxxxxxxxxxxxxxxxxxxxxxxxxxxx | 0x0000000000000000 | 0xffffffff |
| ⋮ | ⋮ | ⋮ | ⋮ | ⋮ |
| Free chunk | 0xfffffffd | xxxxxxxxxxxxxxxxxxxxxxxxxxxxxxxx | 0x0000000000000000 | 0xffffffff |
| Free chunk | 0xfffffffe | xxxxxxxxxxxxxxxxxxxxxxxxxxxxxxxx | 0x0000000000000000 | 0xffffffff |
| Free chunk | 0xffffffff | xxxxxxxxxxxxxxxxxxxxxxxxxxxxxxxx | 0x0000000000000000 | 0xffffffff |

Object #1:
- Address (32 bits): value 0x4
- Signed 8 bit integer: value 0xff => -1
- Unsigned 8 bit integer: value 0xff => 255
- Unsigned 16 bit integer: value 0x1234 => 4660
- Unsigned 64 bit integer: value 0x123456789abcdef0 => 1311768467463790320

Access with chunk address + offset. Example:
- 0x00000000 : 0x00000000 => address 0x4 (object #3)
- 0x00000000 : 0x00000005 => unsigned 8 bit integer (255)
- 0x00000000 : 0x0000000a => error (access in the middle of a field)
- 0x00000000 : 0x00000010 => error (access to a free chunk)
- 0x00000000 : 0x00000020 => error (access to object #2 from object #1)

Instruction format

Example for a load 32 bit constant instruction

| Memory type | | | | Data |
|---|---|---|---|---|
| 1 | 000 | Register | Type | Constant |

1: specify that the data holds an instruction
000: specify that the memory type and the 32 bit data hold a load constant instruction
Register: register number in which the data will be loaded
Type: type of the constant
- 0000: uint32
- 0001: int32
- 0010: real32
- 0011: complex16
- 0100: character32
- 0101: offset
- 0110: frame_address
- 0111: entity_address0
- 1000: entity_address1
- 1001: entity_address2
- 1010: object_address0
- 1011: object_address1
- 1100: object_address2
- 1101: string_address0
- 1110: string_address1
- 1111: string_address2

Constant: data to be loaded into the register with the type specified above

FIG. 9

Load constant address

| Instruction | Registers | Memory |
|---|---|---|
| ; allocate an object | | |
| r0 = allocate 32 | r0 address 0x00000000 | |
| ; allocate a function | | |
| r1 = allocate 8 | r1 address 0x00000002 | |
| ; Add an offset to r1 | | |
| r1.convert full-address | r1 full-address 0x2:0x0 | |
| ; generate a load object address | | |
| r1.gen r0 = {r0} | r1 full-address 0x2:0x4 | 0x00000002:0x0 load r0, address 0x00000000 |
| ; generate a return | | |
| r1.gen return | r1 full-address 0x2:0x8 | 0x00000002:0x4 return |

FIG. 10

COMPUTER ARCHITECTURE

BACKGROUND

A computer architecture determines the function, organization and implementation of computer systems. Computer architecture can involve instruction set architecture and memory architecture.

The most commonly used architecture for a computer is the Von Neumann architecture where data and instructions share the same memory. The memory and the registers are just a storage, and the meaning of their content is only decided by the use the processor wants and therefore by the program which is run.

The Harvard architecture physically separates storage of instructions and data, but the meaning of the data memory content is still decided by the processor.

Virtual memory mechanisms allow a processor to isolate memory allocated for each task. When executing at a higher privilege level, a program can do anything it wants to do including breaking the consistency of the memory. A bug in an operating system may lead to corruption or misinterpretation of information in the memory. A bug in a program can lead to corruption or misinterpretation of the task's memory.

BRIEF DESCRIPTION OF THE DRAWINGS

FIG. 3 illustrates a layout of a tagged memory in accordance with an implementation.

DETAILED DESCRIPTION

Figure 1:
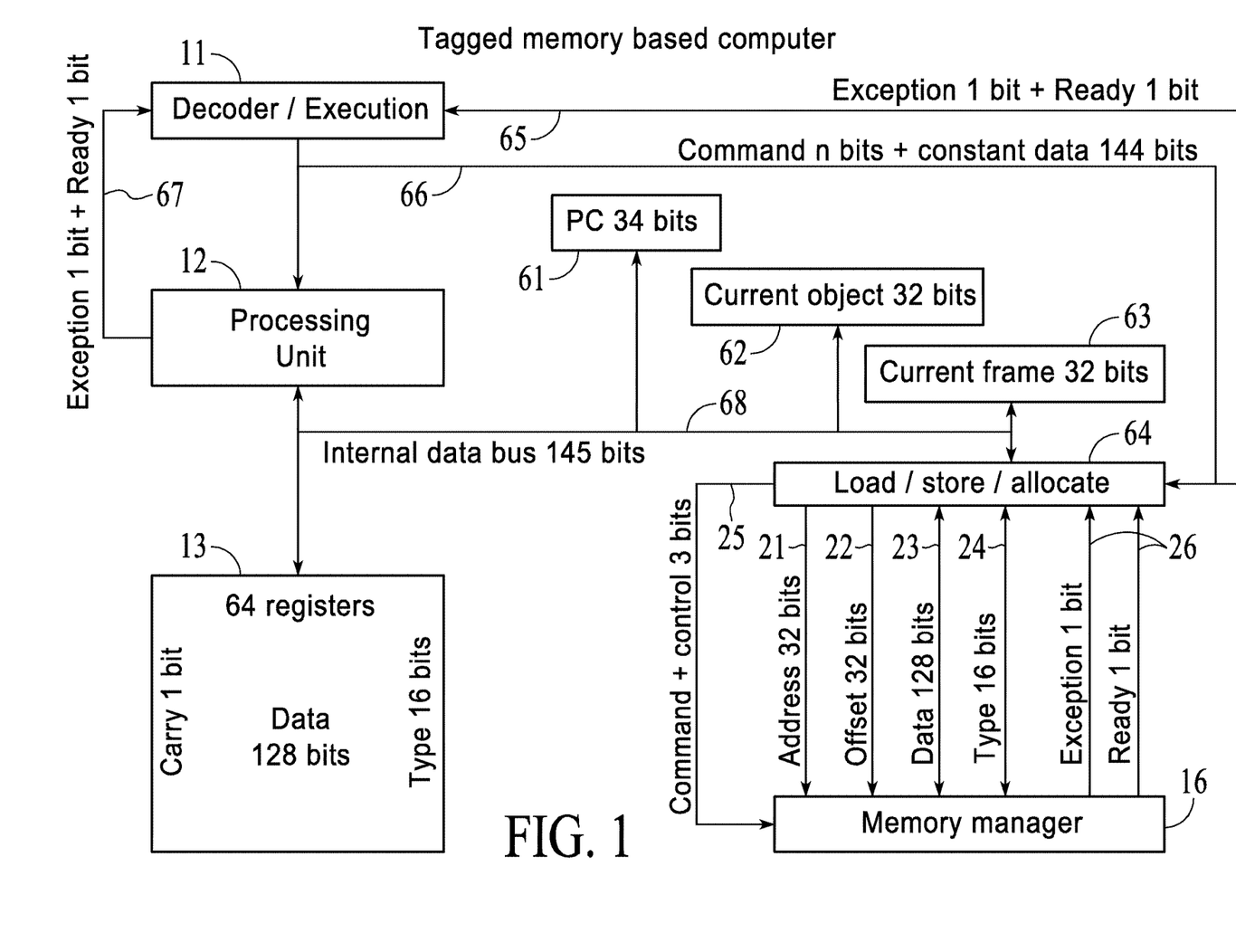
FIG. 1 is a simplified block diagram of a tagged memory based computer in accordance with an implementation.

FIG. 1 is a simplified block diagram illustrating implementation of a tagged memory based computer. A memory manager 16, as more fully described below, manages a tagged memory 15, shown in FIG. 2. Tagged memory 15 is divided into small memory chunks (typically 16 or 32 bytes) and with associated control data (i.e., a "tag") associated with each memory chunk of data. This is further described below.

In FIG. 1, a processing unit 12 receives instructions and data from a decoder/execution block 11 over a 144-bit command and data bus 66. For example, processing unit 12 is an arithmetic logic unit (ALU) or a central processing unit (CPU) or some other type of processor. Status bus 67 provides status signals from processing unit 12 to decoder/execution block 11 including a 1-bit exception signal and a 1-bit ready signal.

Processing unit 12 executes the instructions using registers from a register bank 13 and/or tagged memory 15 and a load/store/allocate block 64. In the example shown in FIG. 1, there are 64 registers. Each register has 128 bits of data and at least 16 bits specifying type of data held by the register. There is only one bank of registers which can be used for any purpose, as the type is embedded in information stored in each register. Each register holds a carry that results from an operation which generates a result stored in register.

A 145-bit internal data bus 68 is connected to processing unit 12, registers within register bank 13, a 34-bit program counter (PC) 61, a 32-bit current object register 62, a 32-bit current frame register 63 and load/store/allocate block 64. Program counter register 61 holds an address of the current instruction. Current object register 62 holds an address of the current object associated to the current function (also named "this" or "self" in object oriented languages). Current frame register 63 holds the address of the memory chunk of memory which holds the arguments given to the current function, the spilled values, the return values and the return information. For example, return information can include a caller's "current object", a caller's "current frame" and a caller's program counter.

Load/store/allocate block 64 communicates with memory manager 16. The interface between load/store/allocate block 64 memory manager 16 includes a 32-bit address bus 21, a 32-bit offset bus 22, a 128-bit data bus 23, a 16-bit type bus 24, 3-bit control bus 25 and a 2-bit status bus 26. Status bus 26 carries a 1-bit exception signal and a 1-bit ready signal.

Load/store/allocate block 64 is connected to 144-bit command and data bus 66. Status bits 65 sent from load/store/allocate block 64 to decoder/execution block 11 include a 1-bit exception signal and a 1-bit ready signal.

FIG. 1 is simplified to clarify important details. Persons of ordinary skill in the art will understand that additional logic will include intermediate latches, clocks, aggregation of signals, timing circuitry and so on. For the implementation shown in FIG. 1, a linked list of "call frames" is used instead of a stack. Also the size of registers and buses can be configured differently to take into account applications and available technology, as will be understood by persons of ordinary skill in the art. Further, almost any internal architecture can be used provided the following three criteria are followed. First, each register, memory or bus that holds or carries data must also hold or carry information pertaining to the type of data. Second, the processing unit can only execute valid and authorized operations on data. Third, all memory accesses are performed via a base address and an offset.

Figure 2:
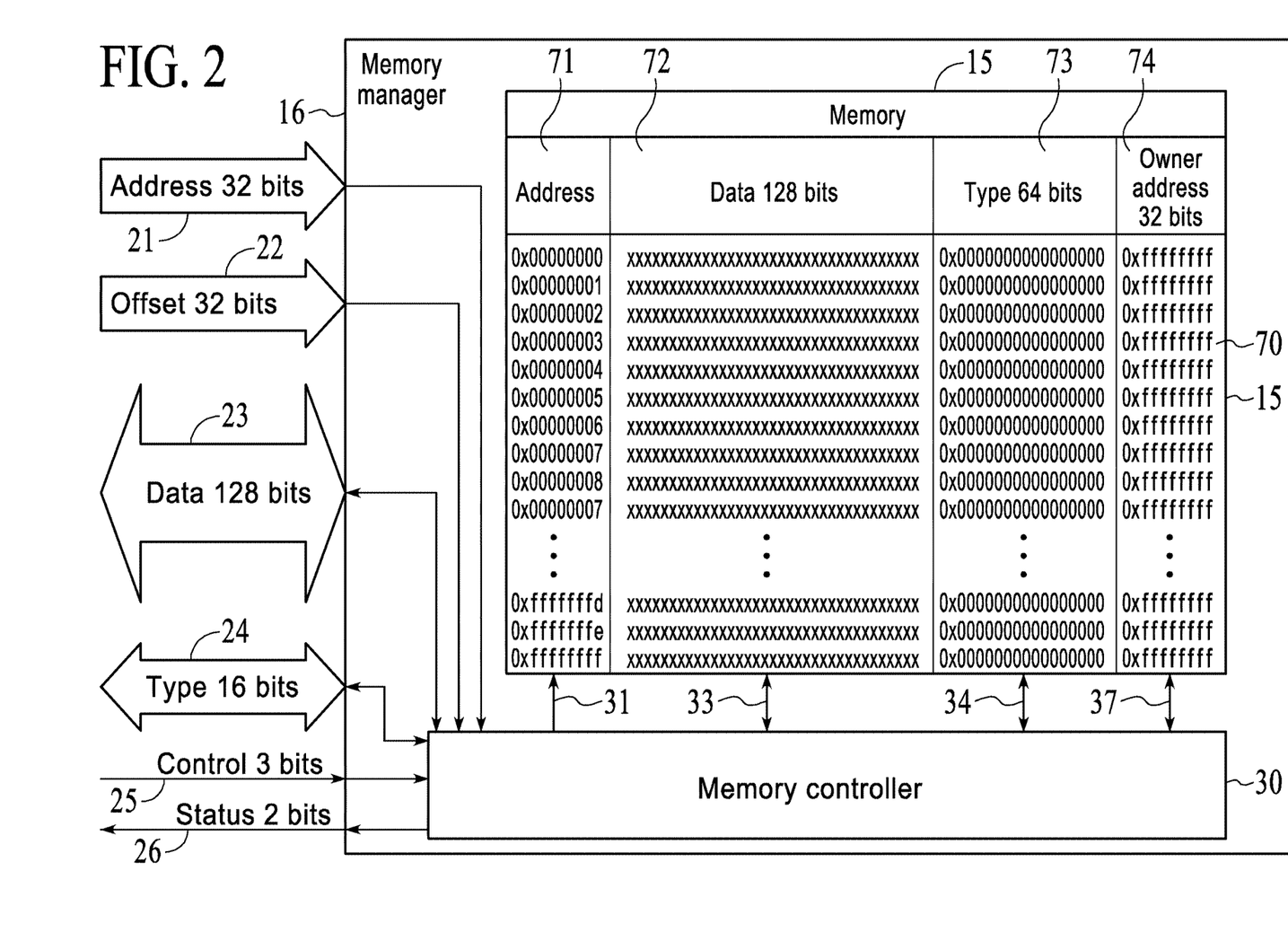
FIG. 2 is a simplified block diagram of a memory manager in accordance with an implementation.

FIG. 2 shows additional information on implementation of memory manager 16. Only memory manager 16 can synthesize an address by allocating a memory chunk of memory. An address cannot be modified or synthesized by the processing unit 12 (except the null address which can be synthesized by processing unit 12).

An instruction can hold an address (constant) to be loaded into a register. The only way to synthesize such an instruction is to use a special instruction which takes the address from a register and writes the instruction, including type, opcode and constant, into memory. This way, even if it looks like an instruction can synthesize an address, nevertheless the origin of the address is still the memory manager. This is illustrated by the instruction shown in FIG. 9, as is discussed further below.

A tagged memory 15 is divided in small memory chunks that are typically 16 or 32 bytes, but can be smaller or larger.

Control data (i.e., a "tag") is associated with each memory chunk of data. This control data allows a memory manager 16 to check that only allowed memory accesses are performed. This increases security, as it allows isolation of tasks without the need of a virtual memory or system calls mechanism. It provides memory protection even for systems that run without a centralized operating system or even that run without any operating system. This also ensures that data always has a type and is not to be regarded as merely a set of bits with no associated type.

Memory manager 16 allocates memory "objects". An object takes up one or more memory chunks. For example, the memory chunks of an object are sequential within tagged memory 15.

All memory accesses by processor 12 are performed using an object address and an offset within this object. The object address is the address of the first memory chunk in the sequence of memory chunks that form the object. For example, the first memory chunk in the sequence of memory chunks has an address 0, the second memory chunk in the sequence of memory chunks has an address 1, and so on. The offset is the offset from the object address to the memory location to be accessed. The object address and the offset are translated by memory manager 16 into a memory location within tagged memory 15.

In tagged memory 15, each entry contains one memory chunk of data. Each entry can be accessed by its address 71. Each entry in tagged memory has three memory fields: a 128-bit data field 72, a 64-bit type field 73 and a 32-bit owner address field 74. The number of bits for each field is only exemplary and will vary with memory configuration, application and so on. The data in data field 72 is referred to as a "memory chunk" of data, which in the example shown in FIG. 2 includes 16 bytes of data. Memory chunks of other sizes can also be used. Values in type field 73 defines the type for each of the 16 bytes of data. Values in owner address field 74 provides an address of the object which owns the memory chunk of memory.

A memory controller 30 within memory manager 16 is the only entity able to directly read and write the fields of tagged memory 15. Memory controller 30 communicates with memory manager 16 using an internal address bus 31, an internal data bus 33, an internal type bus 34, an internal owner address bus 37 and control bus 38.

When the object is allocated by memory manager 16, an increment for the allocated size of an object is equal to the minimum memory chunk size. The object address is assigned to an owner address field 74 (shown in FIG. 2) of every memory chunk included within the object. The object address within owner address field 74 serves as a "tag", associating every allocated memory chunk with an object. A memory chunk that has an address of an object within the owner address field 74 of the memory chunk is owned by that object. When the object is deallocated, the owner address field 74 of the memory chunk is changed so that the memory chunk is no longer owned by the object.

Herein memory fields (i.e., data field 72, type field 73 and owner address field 74) are system fields indicating configuration of tagged memory 15 and are distinguished from object fields that are fields of data defined for an object. For example, an object field may be one byte of data or multiple bytes of data within an object allocated within tagged memory 15.

When an access is made to an object field located within an object that has been allocated to tagged memory 15, the access is made using the object address and an offset to the beginning of the object field. Memory manager 16 translates the received object address and offset to calculate an accessed memory location. The calculated memory location will reside in a memory chunk within tagged memory 15. Before making the access, memory manager 16 will check a value in owner address field 74 of the memory chunk that includes the calculated memory location to ascertain whether the value in owner address field 74 is equal to the object address. If the value in owner address field 74 of the memory chunk is equal to the object address, the access is granted. If the value in owner address field 74 is not equal to the object address, an exception is raised because the offset has designated a memory location that is not within the object.

An entity, such as processor 12, that is outside memory manager 16 can only access a memory chunk of memory within memory manager 16 by providing memory manager 16 with an address of the object, placed on address bus 21, and an offset within an object, placed on offset bus 22. Memory manager 16 uses the object address and the offset to generate the address of a memory chunk of memory and a byte within this memory chunk of memory. For example, the address of the memory chunk is calculated with the formula object address +offset/16 when there are sixteen bytes of data within a memory chunk. For example, when there are sixteen bytes within a memory chunk, the first byte of data within the memory chunk of memory is calculated by performing a logical AND operation between the offset and the hexadecimal value 0xf. The byte is the beginning of a field of the object.

FIG. 3, shows an example of a memory state. In the example shown in FIG. 3, three objects are allocated, as illustrated by a column 70. Each object has a different size: Object #1 (owner address 0x00000000) has 16 bytes, object #2 (owner address 0x00000002) has 32 bytes and object #3 (owner address 0x00000004) has 64 bytes.

For example, in FIG. 3, object #1 has five object fields. Starting from the left side of data field 72 for the entry for object #1: the first object field is 32-bit address field that holds the value "0xff"; the second object field is an 8-bit signed integer field that holds the value "0xff"; the third object field is an 8-bit unsigned integer field that holds the value "0xff"; the fourth object field is a 16-bit integer field that holds the value "0x1234"; the fifth object field is a 64-bit unsigned integer field that holds the value "0x123456789abcdef0". The exact format of the type field is implementation dependent but, the format must be able to specify the cutting of the data field in smaller object fields and, for each of these object fields, must be able to specify the type of the data. An object field must be fully contained in one data field and therefore, cannot belong to two memory chunks.

For example, in one implementation, the following types are allowed for an 8-bit chunk of data, a 16-bit chunk of data, a 32-bit chunk of data, a 64-bit chunk of data and a 128-bit chunk of data. An 8-bit chunk of data uses 3 bits within the type field to indicate one of the following types: undefined; a Boolean, an 8-bit character; a signed 8-bit integer; an unsigned 8-bit integer; a mini float.

A 16-bit chunk of data uses 6 bits within the type field to indicate one of the following types: undefined; a 32-bit character; a signed 32-bit integer; an unsigned 32-bit integer; a mini float complex number; a half precision float number.

An 32-bit chunk of data uses 14 bits within the type field to indicate one of the following types: undefined; an 32-bit character; a signed 32-bit integer; an unsigned 32-bit integer; a half precision float number; a single precision float number; a frame chunk address; an entity chunk address (<4 kilobits, <4 megabits, <4 gigabits); an object k address (<4 kilobits, <4 megabits, <4 gigabits); a string chunk address (<4 kilobits, <4 megabits, <4 gigabits); a code chunk address (<4 kilobits, <4 megabits, <4 gigabits); an offset within a chunk; an instruction; an instruction with a 32 bit data field.

A 64-bit chunk of data uses 30 bits within the type field to indicate one of the following types: undefined; a signed 64-bit integer; an unsigned 64-bit integer; single precision complex number; a double precision float number; an entity field address (entity chunk address+offset); an object field address (entity chunk address+offset); a string character address (entity chunk address+offset); an instruction with a 64-bit data field.

A 128-bit chunk of data uses 62 bits within the type field to indicate one of the following types: undefined; a signed 128-bit integer; an unsigned 128-bit integer; a double precision complex number; an extended precision (80 bits) float number; a quadruple precision float number; a channel id (device+channel+key); an instruction with a 128-bit data field.

The following examples are given of how memory manager 16 will respond when a process task attempts to access memory 15 using the following memory chunk address and offset for a location within object #1.

When the process task for object #1 attempts a read using a memory chunk address of 0x00000000 on address bus 21 and an offset of 0x00000000 on offset bus 22, memory manager 16 will calculate that this accesses the first object field of object #1 and will return the value "address 0x00000004" from the first object field.

When the process task for object #1 attempts a read using a memory chunk address of 0x00000000 on address bus 21 and an offset of 0x00000005 on offset bus 22, memory manager 16 will calculate that this accesses the third object field of object #1 and will return the value "8-bit unsigned 0xff" from the third object field.

When the process task for object #1 attempts a read using a memory chunk address of 0x00000000 on address bus 21 and an offset of 0x0000000a on offset bus 22, memory manager 16 will calculate that this attempted access is in the middle of the fifth object field of object #1 and will return an error.

When the process task for object #1 attempts a read using a memory chunk address of 0x00000000 on address bus 21 and an offset of 0x00000010 on offset bus 22, memory manager 16 will calculate that this attempted access is for a free memory chunk within memory 15 and will return an error.

When the process task for object #1 attempts a read using a memory chunk address of 0x00000000 on address bus 21 and an offset of 0x00000020 on offset bus 22, memory manager 16 will calculate that this attempted access is for a memory chunk within memory 15 that is within control of object #2 and will return an error.

Figure 4:
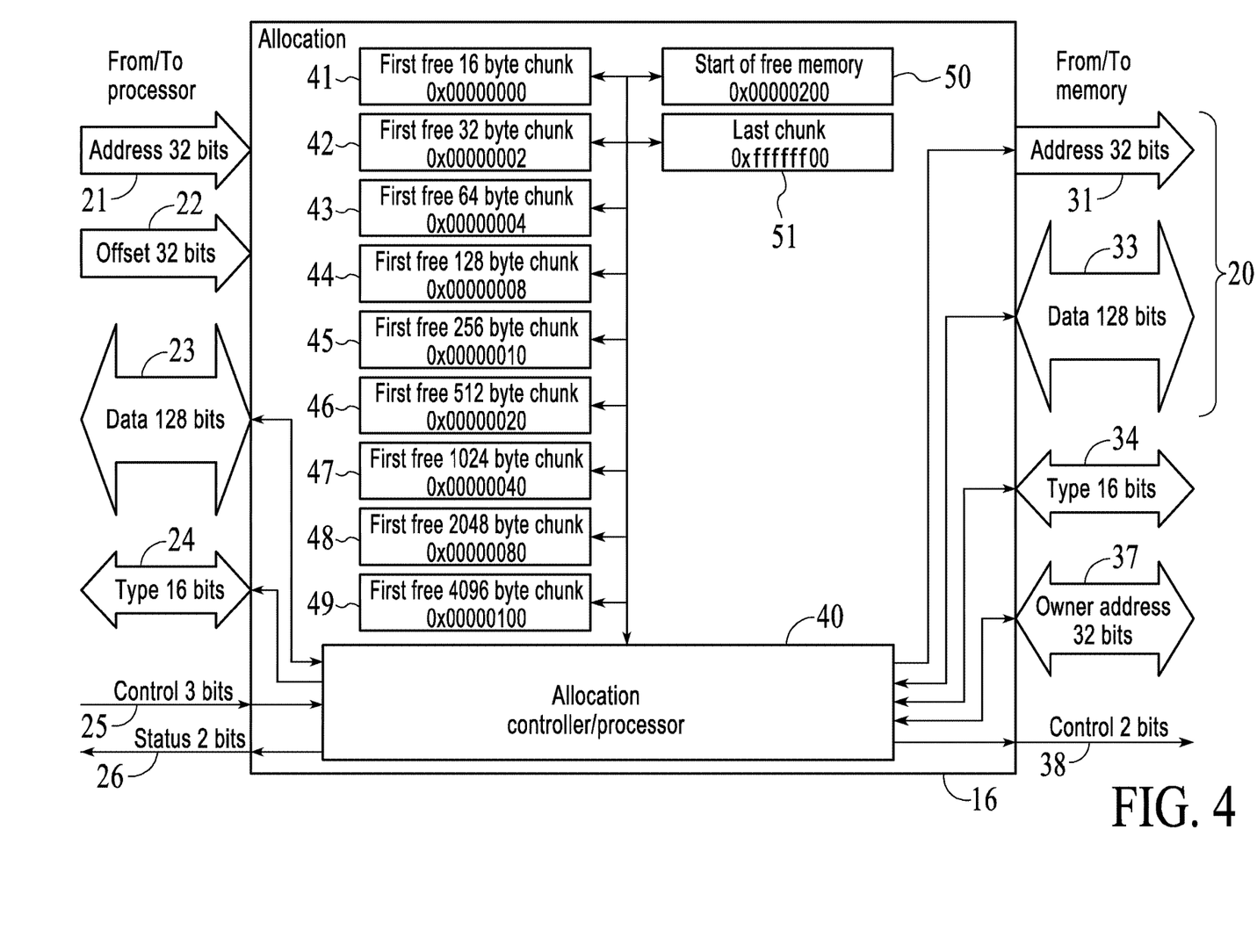
FIG. 4 illustrates allocation of memory in accordance with an implementation.

FIG. 4 illustrates memory manager 16 performing an allocation within tagged memory 15 for an object. This is just an implementation example. Any implementation which performs the task can be used, including an embedded CPU which only deals with allocation and deallocation of memory. For example, memory manager 16 uses an allocation controller/processor 40 to perform the allocation. For example, allocation controller/processor 40 may be within memory controller 30. To allocate memory for the object, an allocation command is placed on control bus 25. The size of the allocation (e.g., from one byte to four Gbytes) is placed on data bus 23. Memory manager 16 uses internal registers to do the allocation.

For example, the current address of the first free 16-byte memory chunk of memory available in tagged memory 15 is stored in a register 41. For example, the current address of the first free 32-byte memory chunk of memory available in tagged memory 15 is stored in a register 42. For example, the current address of the first free 64-byte memory chunk of memory available in tagged memory 15 is stored in a register 43. For example, the current address of the first free 128-byte memory chunk of memory available in tagged memory 15 is stored in a register 44. For example, the current address of the first free 256-byte memory chunk of memory available in tagged memory 15 is stored in a register 45. For example, the current address of the first free 512-byte memory chunk of memory available in tagged memory 15 is stored in a register 46. For example, the current address of the first free 1024-byte memory chunk of memory available in tagged memory 15 is stored in a register 47. For example, the current address of the first free 2048-byte memory chunk of memory available in tagged memory 15 is stored in a register 48. For example, the current address of the first free 4096-byte memory chunk of memory available in tagged memory 15 is stored in a register 49. For example, the address where free memory starts in tagged memory 15 is stored in a register 50. For example, the address of the last memory chunk of memory in tagged memory 15 is stored in a register 51.

For example, in order to allocate 30 bytes of memory to the object, memory manager 16 accesses register 42 to identify the address of the first free 32-byte memory chunk of memory within tagged memory 15. The address stored in register 42 becomes the address of the allocated object, that is, the object address. Accessing the object address, the value found in owner address field is placed in register 42. This becomes the new address for the first free 32-byte memory chunk of memory within tagged memory 15. The object address is then loaded into owner address field 74 for the object address. The object address is also loaded into the owner address field 74 for the next address following the object address, thus allocating two 16-byte memory chunks to complete the 32-byte memory chunk allocation for the object. The value 0x8000000000000000 is loaded into type field 73 for both 16-byte memory chunks allocated to the object, indicating the type is currently undefined. Since the allocation only requires 30 bytes, only two 16-byte memory chunks of tagged memory 15 are needed for the allocation.

The object is now allocated. To report the allocation, the object address is output on data bus 23, the type "address" (constant 0x400a) is output on type address 24 and "data ready" is output on status bus 26. The process task that emitted the allocation command can use the result (address with its indissociable type) and store it into a register or into memory.

If register 42 now holds the null pointer (which is 0xffffff), there is no 32-byte memory chunk currently available. Therefore, memory manager 16 will make two 32-byte memory chunks available using a 64-byte memory chunk. Memory manager will use the address in register 43 to obtain the address of the first available 64-byte memory chunk. This address becomes address of the first newly allocated 32-byte memory chunk. The value in ownership address field is placed in register 43 to indicate the updated first available 64-byte memory chunk.

The value placed in the owner address field of the first 16-byte memory chunk of the first newly allocated 32-byte memory chunk will be the address of the first 16-byte memory chunk of the second newly allocated 32-byte memory chunk. The value placed in the owner address field of the first 16-byte memory chunk of the second newly allocated 32-byte memory chunk will be the null pointer (which is 0xffffffff).

If register 43 now holds the null pointer (which is 0xffffffff), there is no 64-byte memory chunk currently available. Therefore, memory manager 16 will make two 64-byte memory chunks available using a 128-byte memory chunk. Memory manager will use the address in register 44 to obtain the address of the first available 128-byte memory chunk. This address becomes address of the first newly allocated 64-byte memory chunk. The value in ownership address field is placed in register 44 to indicate the updated first available 128-byte memory chunk.

The value placed in the owner address field of the first 16-byte memory chunk of the first newly allocated 64-byte memory chunk will be the address of the first 16-byte memory chunk of the second newly allocated 64-byte memory chunk. The value placed in the owner address field of the first 16-byte memory chunk of the second newly allocated 64-byte memory chunk will be the null pointer (which is 0xffffffff).

If register 44 now holds the null pointer (which is 0xffffffff), there is no 128-byte memory chunk currently available. Therefore, memory manager 16 will make two 128-byte memory chunks available using a 256-byte memory chunk in the same manner described above for making two 32-byte memory chunks available and two 64-byte memory chunks available. If register 45 now holds the null pointer (which is 0xffffffff), there is no 256-byte memory chunk currently available, memory manager 16 will make two 256-byte memory chunks available using a 512-byte memory chunk. If register 46 now holds the null pointer (which is 0 xffffffff), memory manager 16 will make two 512-byte memory chunks available using a 1024-byte memory chunk. If register 47 now holds the null pointer, memory manager 16 will make two 1024-byte memory chunks available using a 2024-byte memory chunk. If register 48 now holds the null pointer, memory manager 16 will make two 2048-byte memory chunks available using a 4048-byte memory chunk. If register 49 now holds the null pointer, memory manager 16 will use values in register 50 and register 51 to obtain a 4096-byte memory chunk. If no more 4096-byte memory chunks are available, a next allocation request may fail.

The allocation process described above will have lower priority than read operations and write operations performed to tagged memory 15. If a new allocation operation occurs while allocation controller 40 is restoring registers 41 to 49 in accordance with the allocation process described above and the register associated to the size of the wanted allocation contains the null pointer, the new allocation operation is stalled until a memory chunk becomes available. If an object with a size greater than 4096-byte is requested, an indirection mechanism is used. The type of the returned address reflects this indirection (for example, the return type is 0x400b up to 4M bytes and 0x400c up to 4G bytes). An object with indirection can be resized in some ways but memory manager 16 will not allow a size greater than the size allowed by the initial indirection level. That is, the level of indirection cannot change at all during the life of the object.

As the type of everything stored in memory is known, memory manager 16 manages the deallocation of unused objects by looking at tagged memory 15, for example at a time when tagged memory 15 is not being accessed by another process task or during refresh cycles. Memory manager 16 must have access to the processor registers to be able to mark as "used" objects referenced by registers. When memory is deallocated, two contiguous memory chunks of the same size can be aggregated to form single contiguous memory chunk, double the size of its two parts. The maximum memory chunk size created during allocation is 4096 bytes.

Figure 5:
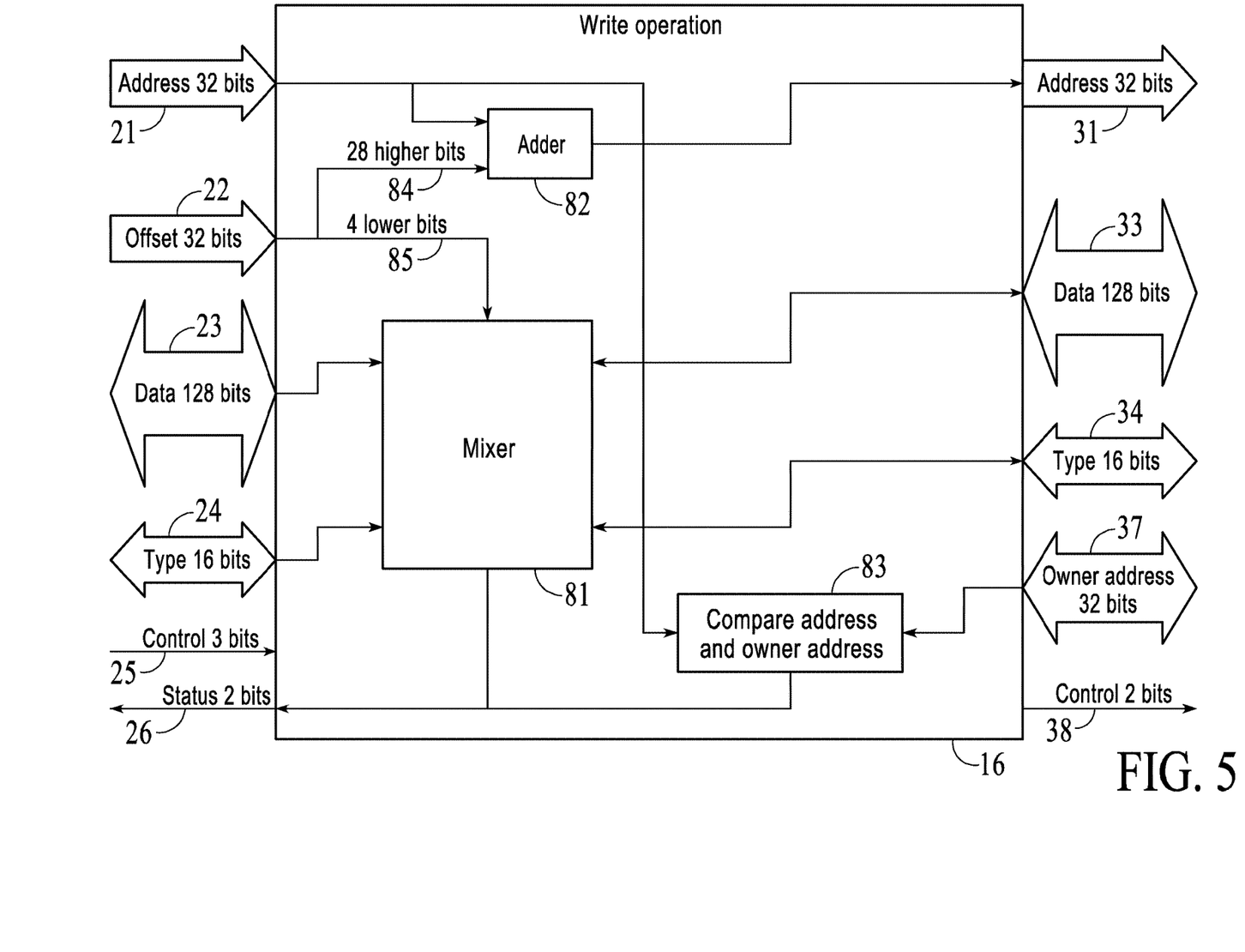
FIG. 5 illustrates a write operation to memory in accordance with an implementation.

FIG. 5 illustrates a write operation performed by memory manager 16. For example, memory manager 16 uses an adder 82, a mixer 81 and a compare address and owner address block 83 to perform the write. For example, adder 82, mixer 81 and compare address and owner address block 83 may be within memory controller 30. The four lower bits 85 of offset bus 22 are received by mixer 81. The 28 higher bits of offset 32 are received by adder 82.

Immediately after an allocation, a write can be performed into an object. To write into the object a process task that owns the object provides: the address of the object on address bus 21; an offset (positive or zero) inside this object on offset bus 22; the type of the data being written on type bus 24; the data to be written on data bus 23; and the initialize command, write command or overwrite command on control bus 25. Memory manager 16 then performs the write.

To perform the write, memory manager 16 uses mixer 81, four lower bits 85 of offset bus 22 and the 16-bit type of type bus 24 to compare the alignment of the write to the size requirements of the type of data to be written. If the alignment is incorrect, an exception is returned on status bus 26. To be correctly aligned: when performing a write to a type requiring a 16-bit field, the memory location to be written must be 16-bit aligned; when performing a write to a type requiring a 32-bit field, the memory location to be written must be 32-bit aligned; when performing a write to a type requiring a 64-bit field, the memory location to be written must be 64-bit aligned and when performing a write to a type requiring a 128-bit field, the memory location to be written must be 128-bit aligned.

If the alignment is correct, the address of the 16-byte memory chunk of memory for the memory write is calculated using the formula "address +offset/16". For example, adder 82 performs the addition by adding the address on address bus 21 with 28 higher bits 84 of the offset on offset bus 22.

Using the calculated address, memory manager 16 obtains from the memory location values in owner address field 74, type field 73 and data field 72. The value in owner address field 74 is compared to the address received from address bus 21. If they differ, it's a forbidden memory access and an exception is returned on status bus 26.

The address of the field within the 16-byte memory chunk is given by "offset AND 0xf", which is four lower bits 85 of the offset on offset bus 22. Memory manager 16 checks the compatibility of the type of the data to be written with the content of the memory chunk described by type field 73 for the write location in the 16-byte memory chunk. For example, if the command on control bus 25 is "initialize", the type of the bytes at the write location write must be "uninitialized". If the command on control bus 25 is "write", the type of the bytes to be written to the memory location must match the current type listed in type field 73 for the location. If the command on control bus 25 is "overwrite", the size of the used field must be 64 bits or 128 bits and the type for the memory location must have the attribute "overwritable".

If there is an incompatibility in type so that the type of data to be written does not match the current value in type field 73 of the memory location to be written to, an exception is returned on status bus 26.

If the operation on control bus 25 is "initialize" or "overwrite", memory manager 26 updates type field 73 to reflect the new type for the memory location. If the operation on control bus 25 is "initialize" or "write", memory manager 16 updates the pertinent bytes of data field 72 with the value received from data bus 23. The size (i.e., number of bytes) of the written data is indicated by the type value received from type bus 24).

If the operation on control bus 25 is "overwrite", memory manager 16 updates 8 bytes of data (64 bits) or 16 bytes of data (128 bits) with the value received from data bus 23. If the size of the data (given by type bus 24) is less than 8 bytes or 16 bytes, the value to be written is extended with zeros.

After type field 73 and data field 72 for the accessed memory location are updated, memory manager 16 returns on status bus 26 a "data written" state.

Figure 6:
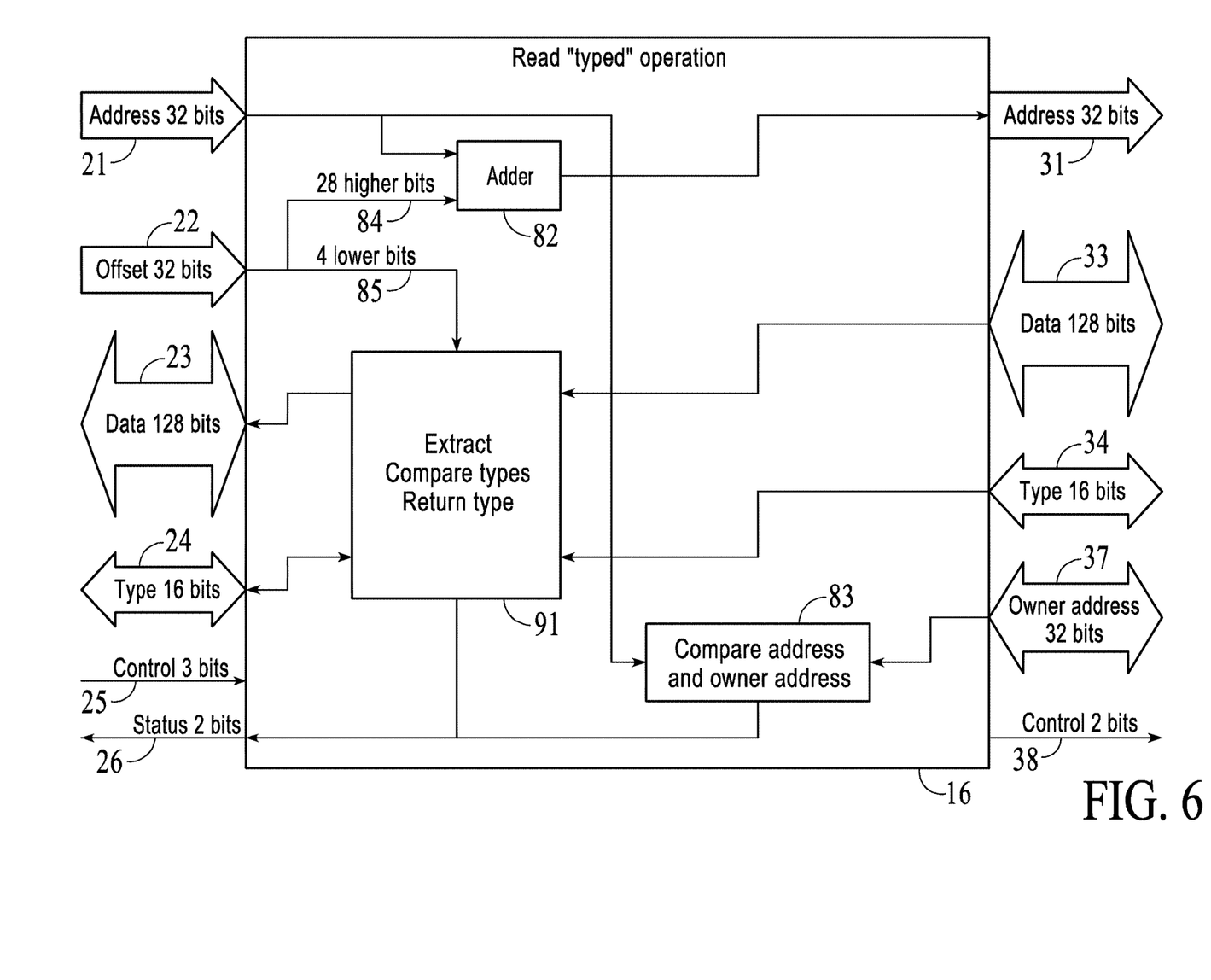
FIG. 6 illustrates a read "typed" operation to memory in accordance with an implementation.

FIG. 6 illustrates a read "typed" operation. When an object has been allocated and when some data has been stored in the object, a process task can read this data with a "typed" read command. The process task must know exactly the type of the data which has been previously stored.

For a "typed" read command, the process task provides the following to memory manager: the address of the object on address bus 21; an offset (positive or zero) inside this object on offset bus 22; the type of the data to read on type bus 24; the "typed read" command on control bus 25. Memory manager 16 performs the "typed" read using adder 82, compare address and owner address block 83 and extract compare types and return types block 91.

First, an alignment of the read is compared to a size of the type of data to be read. If the alignment is incorrect, an exception is returned on status bus 26. To be correctly aligned when performing a read from a type requiring a 16-bit field, the memory location to be read must be 16-bit aligned. To be correctly aligned when performing a read to a type requiring a 32-bit field, the memory location to be read must be 32-bit aligned. To be correctly aligned when performing a read to a type requiring a 64-bit field, the memory location to be read must be 64-bit aligned. To be correctly aligned when performing a read to a type requiring a 128-bit field, the memory location to be read must be 128-bit aligned.

If the alignment is correct, the address of the 16-byte memory chunk of memory for the memory read is calculated using the formula "address +offset/16". For example, adder 82 performs the addition by adding the address on address bus 21 with 28 higher bits 84 of the offset on offset bus 22.

Using the calculated address, memory manager 16 obtains from the memory location values in owner address field 74, type field 73 and data field 72. The value in owner address field 74 is compared to the address received from address bus 21. If they differ, it's a forbidden memory access and an exception is returned on status bus 26.

The address of the field within the 16-byte memory chunk is given by "offset AND 0xf", which is four lower bits 85 of the offset on offset bus 22. Memory manager 16 checks the compatibility of the type of the data to be read on type bus 24 with the content of the memory chunk described by type field 73 for the read location within the 16-byte memory chunk specified the offset.

If there is an incompatibility in type so that the type of data to be read does not match the current value in type field 73 for the memory location to be read, an exception is returned on status bus 26.

If the type matches, memory manager 16 extracts the needed data from the data field 72 within tagged memory 15 and returns the extracted data on data bus 23. Memory manager 16 returns the same type value that was received on type bus 24. Then, memory manager 16 returns "data ready" on status bus 26. The returned type value and data value can be stored in a register or in external memory.

Figure 7:
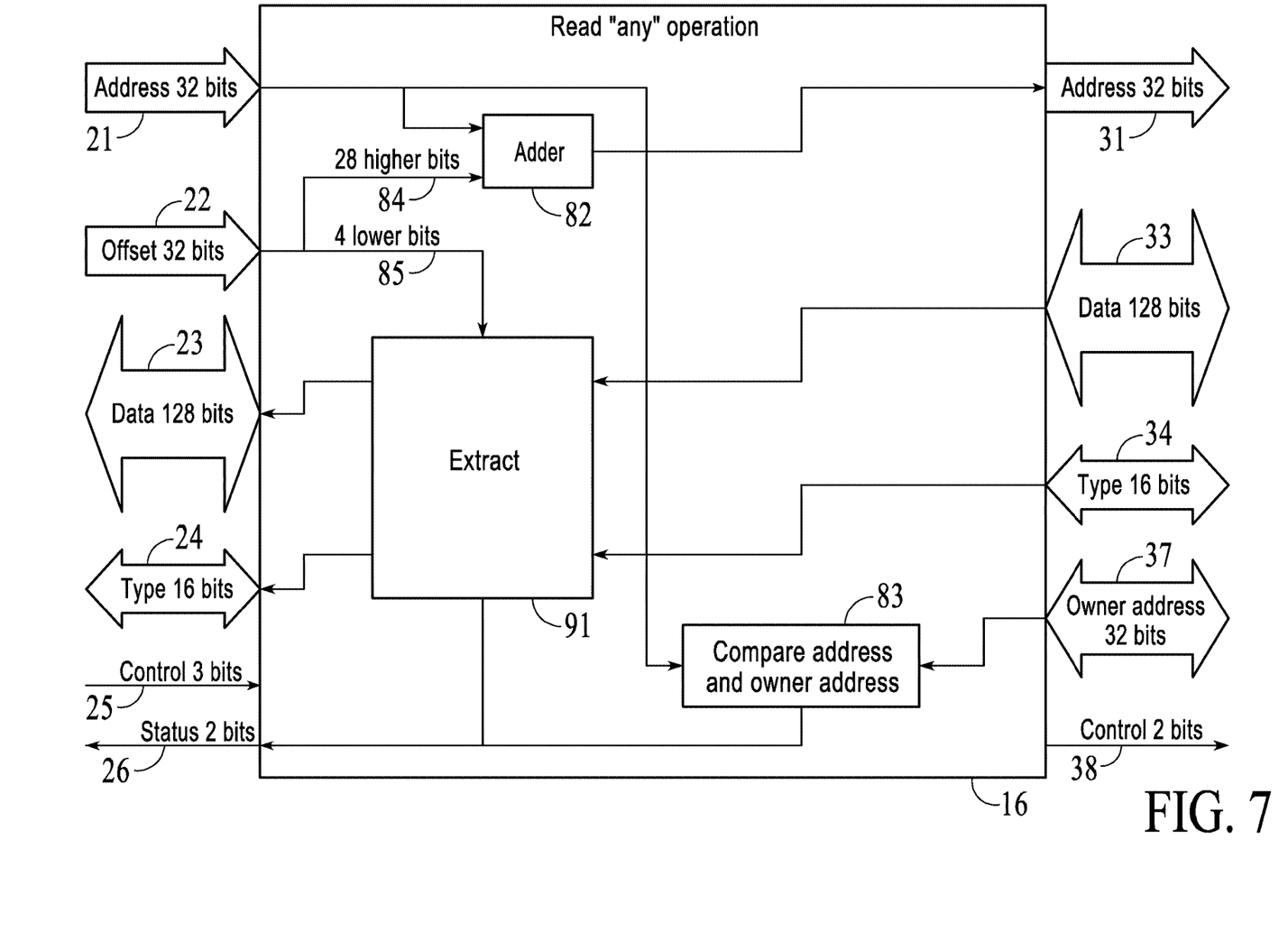
FIG. 7 illustrates a read "any" operation to memory in accordance with an implementation.

FIG. 7 illustrates a read "any" operation. When an object has been allocated and when some data has been stored in the object, a process task can read this data with an "any" read command, which allows reading of data of any type.

For an "any" read command, the process task provides the following to memory manager: the address of the object on address bus 21; an offset (positive or zero) inside this object on offset bus 22; the "typed read" command on control bus 25. Memory manager 16 then performs the read using adder 82, compare address and owner address block 83 and extract block 91.

The address of the 16-byte memory chunk of memory for the memory read is calculated using the formula "address +offset/16". For example, adder 82 performs the addition by adding the address on address bus 21 with 28 higher bits 84 of the offset on offset bus 22.

Using the calculated address, memory manager 16 obtains from the memory location values in owner address field 74, type field 73 and data field 72. The value in owner address field 74 is compared to the address received from address bus 21. If they differ, it's a forbidden memory access and an exception is returned on status bus 26.

The address of the object field within the 16-byte memory chunk is given by "offset AND 0xf", which is four lower bits 85 of the offset on offset bus 22. Memory manager 16 checks to make sure the read is not to be performed in the middle of an object field. If the read is to be performed in the middle of an object field, an exception is returned on status bus 26.

If the read starts at the beginning of an object field, memory manager 16 extracts the needed data from the data field 72 within tagged memory 15 and returns the extracted data on data bus 23. Memory manager 16 returns the value extracted from type field 73 on type bus 24. Then, memory manager 16 returns "data ready" on status bus 26. The returned type value and data value can be stored in a register or in external memory.

Figure 8:
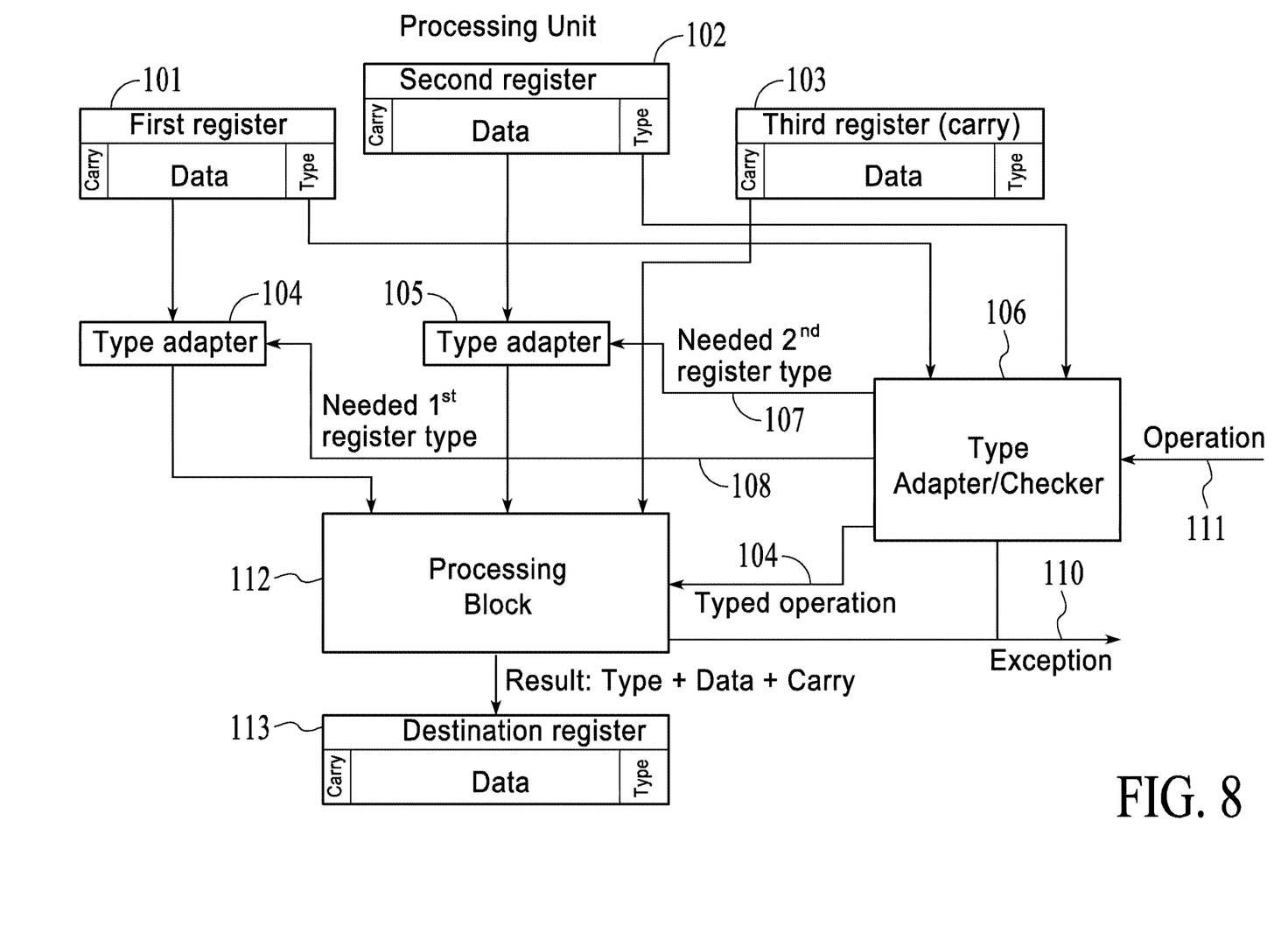
FIG. 8 is a simplified block diagram of a processing unit in accordance with an implementation.

FIG. 8 provides an example of how an arithmetic logic unit (ALU) utilizes tagged memory when carrying out a typical arithmetic instruction like "add with carry". In this example, the data type for the operation is embedded in the data. For all the instructions, the operation type is given by the arguments for the instruction. One of the arguments (a constant) can be embedded with its type within the instruction. This differs from a conventional computer architecture where the data type is embedded in the instruction. This embedding allows a processor to use data type as indicated by a value in the type field of each source argument for the function to determine type of source argument used in execution of the instruction and not the instruction itself to determine type of source argument used in execution of the instruction. This means that the values are always used for what they are. It is not possible, for example, to use a 64-bit integer value as if it was a 64-bit floating point value. There is no implicit bit's meaning reinterpretation. It is never possible to reinterpret an integer as an address.

As illustrated in FIG. 8, for an "add with carry" instruction, there are three source arguments. A first register 101 and a second register 102 each hold a source argument that includes both a data field and a type field. A third register 103 is used only for its carry field. Registers are read from register bank 13, shown in FIG. 1.

To perform the add with carry, type adapter/check block 106 compares the values of the type field of the source argument within first register 101 and the type field of the source argument within register 102. If the types are not compatible, an exception is raised.

Examples of incompatible types for an add with carry instruction include where the data in register 101 and 102 are both "character" type, where either the data in register 101 or 102 are "address" type and where either the data in register 101 or 102 are "Boolean" type.

Examples of compatible types include where a character and a 32-bit unsigned integer are used to produce a character result, where a 32-bit unsigned integer and a 32-bit unsigned integer used to produce a 32-bit unsigned integer result and where a 64-bit float and a 64 bit-float are used to produce a 64 bit-float result.

Examples of types that are optionally compatible include where a 32-bit unsigned integer and a 32-bit signed integer are used to produce a 32-bit unsigned integer result, where a 64-bit unsigned integer and a 32-bit signed integer are used to produce a 64-bit unsigned integer result, where a 64-bit float and a 32 bit-float are used to produce a 64 bit-float result, where a 32-bit float and a 64 bit-float are used to produce a 64 bit-float result and where a 64-bit float and a 64 unsigned integer are used to produce a 64 bit-float result.

When optionally compatible types are being added, a type adapter 104 is used to make any changes necessary to data from first register 101 and a type adapter 105 is used to make any changes necessary to data from first register 102 to allow ALU 112 to perform the operation. ALU 112 performs the operation on the data from first register 101, the data from the second register 102 and the carry from third register 103 and produces a result placed in the data field of destination register 113. The data type for the result placed in destination register 113 is also written into the data field of destination register 113. The contents of definition register 113 may then be written into a register within register bank 13, shown in FIG. 1. If the operation is invalid, ALU 112 generates an overflow or an underflow, and an exception can be raised, depending on the instruction.

For example, when a task provides an object to memory manager 15, the task can specify that the object is read only (constant object) or fully read only (inert object). For an inert object, any address contained within the object is considered as inert. That means that nothing directly or indirectly referenced by the object can be modified.

Memory manager 16 keeps an object alive as long as the object can be accessed. Memory manager 16 has a garbage collection mechanism to reclaim any memory no longer used.

Figure 9:
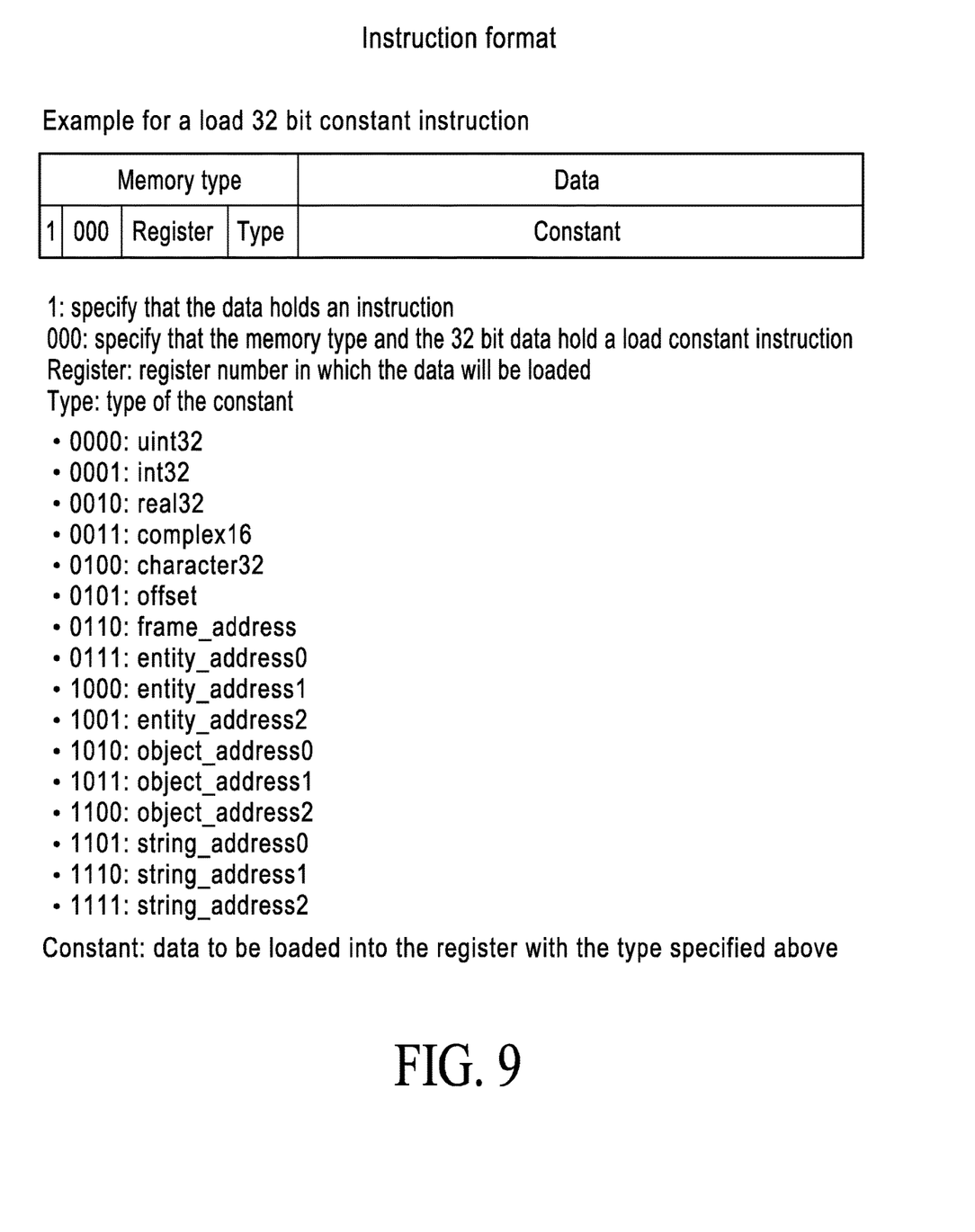
FIG. 9 shows instruction format for a load 32-bit constant instruction in accordance with an implementation.

FIG. 9 provide an example of another instruction format. Within the instruction format, a 64-bit type field is used for a 128-bit data field. Fourteen bits describe the type of data within a 32-bit data fine. Some of these bits, typically 13 bits, can be reused to be part of the instruction opcodes. This leads to a 43-bit opcode. As is illustrated by the instruction format shown in FIG. 9, where only one instruction is used to load a 32-bit constant. For example, it is mandatory that a constant is loaded with only one instruction. If a constant could be loaded with two or more instructions, this would break the model where a type is associated with a value and would allow synthesis of an arbitrary address.

An instruction cannot be created by just writing data into memory. This would break the model and would allow synthesis of any address value. To be able to synthesize an instruction which can synthesize an instruction, an instruction must be used.

Figure 10:
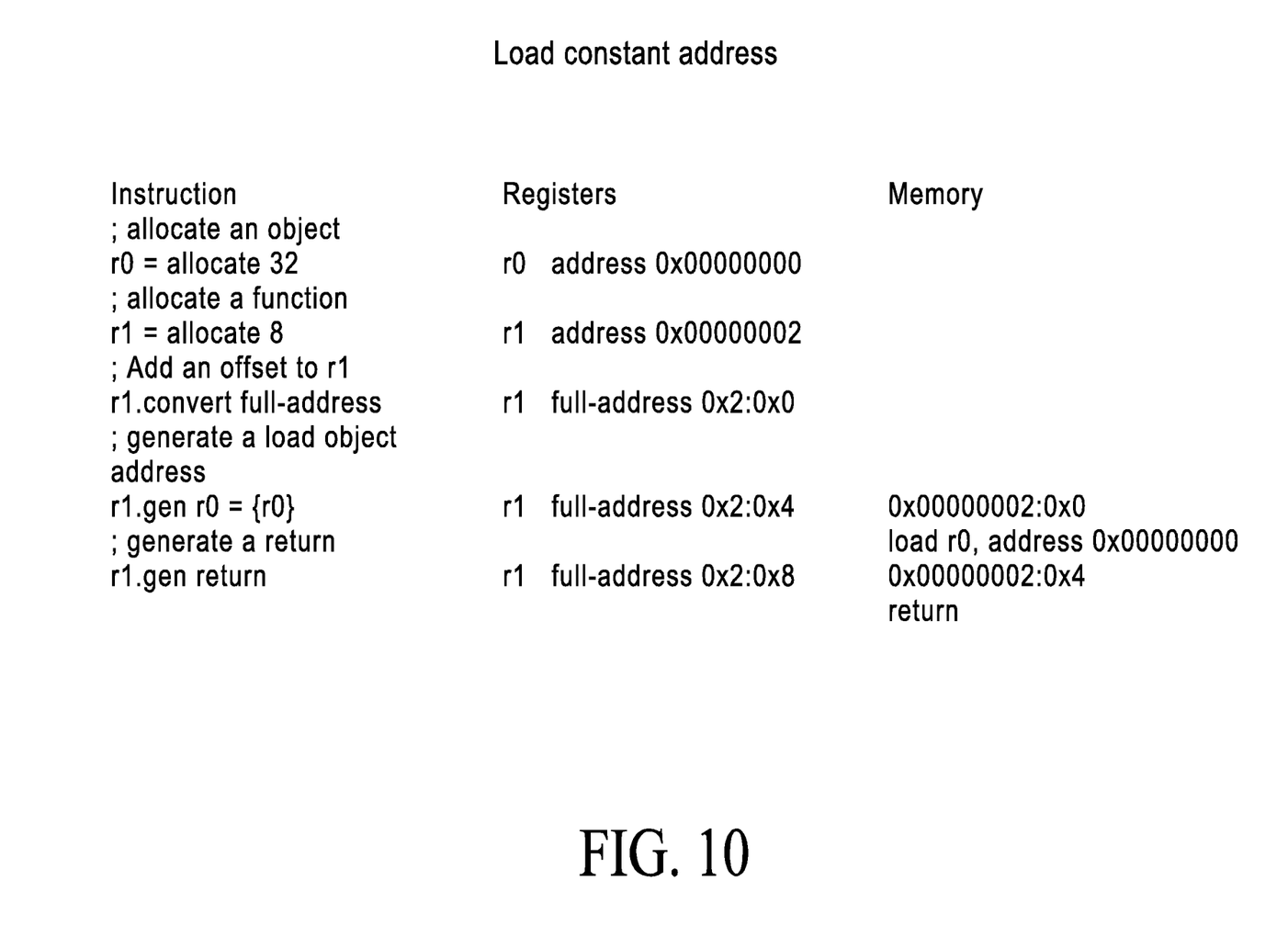
FIG. 10 shows instruction format for a load constant instruction in accordance with an implementation.

FIG. 10 describes how a load constant instruction can be synthesized. For example, first, an object is allocated ("r0=allocate 32"). R0 now contains the address of an object. Then, a second object is allocated ("r1=allocate 8"). R1 now contains the address of an object which will be a function. Then r1 is converted from an address to a full address (address and offset) ("r1.convert full-address"). R1 now contains the address of the function and the offset "0". Then a "load address constant instruction" is synthesized ("r1.gen r0={r0}"). This generates at the full address r1 ( 0x00000002: 0x00000000) the instruction "load r0, address 0x00000000". R0 comes from the first "r0" in the generating instruction and "address 0x00000000" comes from "{r0}" which is "content of r0" at the time of the generation. This also increment the destination register "r1" which has now the value 0x00000002: 0x00000004. Finally, a "return instruction" is generated with the "r1.gen return" instruction. There is no need to indicate that the function object is executable. This indication is provided implicitly by adding instructions to the buffer as the generated data has the type "instruction". Data not typed as instruction cannot be executed. In a standard architecture, data does not include a type field so a region of memory must have an "execution" attribute to be executable. Of course, to bootstrap the system, the system must include a read-only memory containing the instructions to execute at reset The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A memory system, comprising:
   a tagged memory organized into memory chunks, each memory chunk having an associated memory chunk address field for addressing the memory chunk and each memory chunk further including the following fields:
   a data field,
   a type field that indicates type of data stored in the data field, and
   an owner address tag field that indicates which objects own which memory chunks, wherein an object in the tagged memory owns a plurality of memory chunks that are sequentially organized within the tagged memory and wherein the owner address tag field of said at least one object and the associated memory chunk address field of the first memory chunk in said sequentially arranged plurality of memory chunks have a same value; and
   a memory manager that has exclusive ability to allocate the object which comprises said sequentially arranged plurality of memory chunks, deallocate the sequentially arranged plurality of memory chunks, write to the sequentially arranged plurality of memory chunks, and read the sequentially arranged plurality of memory chunks, wherein when a processor requests access to the object allocated in the tagged memory using an object address and an object offset within the object, the memory manager is configured to:
  generate an address of a memory chunk in the tagged memory for access to the object based on the object address and the object offset;
  check whether a value in the owner address tag field of the addressed memory chunk is the same as the generated memory chunk address;
  grant the access to the object when the value in the owner address tag field of the addressed memory chunk is the same as the generated memory chunk address; and
  prevent the access to the object when the value in the owner address tag field of the addressed memory chunk is different from the generated memory chunk address.

2. A memory system as in claim 1, wherein when the processor performs a write operation to a memory location within the tagged memory by providing to the memory manager an object address and an object offset within the object, the memory manager is configured to translate the object address and the object offset into a chunk address for the memory location within the tagged memory in order to perform the write operation.

3. A memory system as in claim 2, wherein when the chunk address for the memory location as translated by the memory manager is not within a memory chunk owned by the object, the memory manager is configured not to perform the write operation and instead raise an exception.

4. A memory system as in claim 1, wherein when the processor performs a read operation from a memory location within the tagged memory by providing to the memory manager an object address and an object offset within the object, the memory manager is configured to translate the object address and the object offset into a chunk address for the memory location within the tagged memory in order to perform the read operation.

5. A memory system as in claim 4, wherein when the chunk address for the memory location as translated by the memory manager is not within a memory chunk owned by the object, the memory manager is configured not to perform the read operation and instead raise an exception.

6. A memory system as in claim 1, wherein when an object is an owner of a plurality of memory chunks, each memory chunk in the plurality of memory chunks having a value in the owner address field that is equal to an address for the object within the tagged memory.

7. A memory system as in claim 1, wherein the data field comprises a plurality of object fields, and wherein the type field indicates a type and a size of each of said object fields.

8. A memory system as in claim 7, wherein the memory manager is further configured to calculate an address in the tagged memory for a requested data, determine whether the calculated address aligns with an object field in the data field in accordance with the corresponding type field, and return an error when it is determined that the calculated address does not align.

9. A memory system as in claim 1, wherein the memory manager is further configured to write a first plurality of object fields in the data field of a first chunk of the object according to a first alignment of object fields indicated in the type field of the first chunk, and a second plurality of object fields in the data field of a second chunk of the object according to a second alignment of object fields indicated in the type field of the first chunk, wherein the first alignment of fields is different from the second alignment of fields.

10. A memory system as in claim 1, wherein the memory manager is further configured to synthesize an instruction by retrieving an address stored in a register and writing the instruction including the retrieved address, a type retrieved from the register, and an opcode, and writing the synthesized instruction to the tagged memory.

11. A computing system comprising:
  a tagged memory organized into memory chunks, each memory chunk having an associated memory chunk address field for addressing the memory chunk and each memory chunk further including the following fields:
    a data field,
    a type field that indicates type of data stored in the data field, and
    an owner address field that indicates which objects own which memory chunks, wherein an object in the tagged memory owns a plurality of memory chunks that are sequentially organized within the tagged memory and wherein the owner address tag field of said at least one object and the associated memory chunk address field of the first memory chunk in said sequentially arranged plurality of memory chunks have a same value;
  a memory manager that has exclusive ability to allocate the object which comprises said sequentially arranged plurality of memory chunks, write to the sequentially arranged plurality of memory chunks, and read the sequentially arranged plurality of memory chunks;
  a plurality of registers, each register having storage capacity to store a value for the data field and a value for the type field; and
  a processor configured to use the registers to execute instructions, the instructions specifying functions that can be performed on source arguments that include values in both the data field and the type field,
  wherein when a processor requests access to the object allocated in the tagged memory using an object address and an object offset within the object, the memory manager is configured to:
    generate an address of a memory chunk in the tagged memory for access to the object based on the object address and the object offset;
    check whether a value in the owner address tag field of the addressed memory chunk is the same as the generated memory chunk address;
    grant the access to the object when the value in the owner address tag field of the addressed memory chunk is the same as the generated memory chunk address; and
    prevent the access to the object when the value in the owner address tag field of the addressed memory chunk is different from the generated memory chunk address.

12. A computing system as in claim 11, wherein the processor is an arithmetic processing unit.

13. A computing system as in claim 11, wherein when the processor performs a write operation to a memory location within the tagged memory by providing to the memory manager an object address and an object offset within the object, the memory manager is configured to translate the object address and the object offset into a chunk address for the memory location within the tagged memory in order to perform the write operation.

14. A computing system as in claim 11, wherein when the processor performs a read operation from a memory location within the tagged memory by providing to the memory manager an object address and an object offset within the object, the memory manager is configured to translate the object address and the object offset into a chunk address for the memory location within the tagged memory in order to perform the read operation.

15. A computing system as in claim 11, wherein the instructions specify functions that can be performed on source arguments of different types so that type of source argument used in execution of the instruction is determined by data type as indicated by a value in the type field of each source argument for the function and not by the instruction itself.

16. A computing system as in claim 11, wherein the type field indicates whether data is an instruction.

17. A computing system as in claim 16, wherein an instruction opcode uses the data field and some bits of the type field.

18. A computing system as in claim 17, wherein the only way to generate an instruction executable in the computing system is by using a special instruction which generates a new instruction.

19. A method for performing memory accesses within a memory system, the method comprising:
   organizing a tagged memory into memory chunks, each memory chunk having an associated memory chunk address field for addressing the memory chunk and each memory chunk further including the following fields:
      a data field,
      a type field, that indicates type of data stored in the data field,
      an owner address tag field that indicates which objects own which memory chunks, wherein an object in the tagged memory owns a plurality of memory chunks that are sequentially organized within the tagged memory and wherein the owner address tag field of said at least one object and the associated memory chunk address field of the first memory chunk in said sequentially arranged plurality of memory chunks have a same value;
   exclusively using a memory manager to allocate the object which comprises said sequentially arranged plurality of memory chunks in the tagged memory, write to the sequentially arranged plurality of memory chunks, and read the sequentially arranged plurality of memory chunks;
   a processor requesting access to the object allocated in the tagged memory using an object address and an object offset within the object; and
   in response to the request for access to the object, the memory manager performs the following steps:
      generating an address of a memory chunk in the tagged memory for access to the object based on the object address and the object offset;
      checking whether a value in the owner address tag field of the addressed memory chunk is the same as the generated memory chunk address;
      granting the access to the object when the value in the owner address tag field of the addressed memory chunk is the same as the generated memory chunk address; and
      preventing the access to the object when the value in the owner address tag field of the addressed memory chunk is different from the generated memory chunk address.

20. A method as in claim 19, additionally comprising performing a write operation by a processor including:
   providing, from the processor to the memory manager, an object address and an object offset within the object,
   translating, by the memory manager, the object address and the object offset into an address for the memory location within the tagged memory, and
   performing, by the memory manager, the write operation to the memory location by the memory manager.

21. A method as in claim 20, wherein when the address for the memory location as translated by the memory manager is not within a memory chunk owned by the object, the memory manager does not perform the write operation and instead raises an exception.

22. A method as in claim 19, additionally comprising performing a read operation by a processor including:
   providing, from the processor to the memory manager, an object address and an object offset within the object,
   translating, by the memory manager, the object address and the object offset into a chunk address for the memory location within the tagged memory, and
   performing, by the memory manager, the read operation from the memory location by the memory manager.

23. A method as in claim 19, additionally comprising executing an instruction by the processor including:
   obtaining source arguments for executing the instruction from a plurality of registers, each register having storage capacity to store a value for the data field and a value for the type field.

24. A method as in claim 23, wherein executing the instruction by the processor additionally includes:
   using, by the processor, data type as indicated by a value in the type field of each source argument for the function to determine type of source argument used in execution of the instruction and not using the instruction itself to determine type of source argument used in execution of the instruction.

* * * * *